United States Patent
Griessbach (12)

(10) Patent No.: US 10,654,195 B2
(45) Date of Patent: May 19, 2020

(54) METHOD FOR PREPARING WASTE POWDER FROM GENERATIVE PRODUCTION PROCESSES

(71) Applicant: Sören Griessbach, Chemnitz (DE)

(72) Inventor: Sören Griessbach, Chemnitz (DE)

(*) Notice: Subject to any disclaimer, the term of this patent is extended or adjusted under 35 U.S.C. 154(b) by 0 days.

(21) Appl. No.: 16/324,205

(22) PCT Filed: Jul. 26, 2017

(86) PCT No.: PCT/DE2017/000233
§ 371 (c)(1),
(2) Date: Feb. 8, 2019

(87) PCT Pub. No.: WO2018/028728
PCT Pub. Date: Feb. 15, 2018

(65) Prior Publication Data
US 2019/0210252 A1   Jul. 11, 2019

(30) Foreign Application Priority Data

Aug. 8, 2016 (DE) .................. 10 2016 009 770

(51) Int. Cl.
| | | |
|---|---|---|
| *B29B 17/04* | (2006.01) | |
| *B29C 41/50* | (2006.01) | |
| *B29C 64/153* | (2017.01) | |
| *B33Y 70/00* | (2020.01) | |
| *B33Y 40/00* | (2020.01) | |
| *B29C 64/357* | (2017.01) | |
| *B29C 64/245* | (2017.01) | |
| *B22F 3/105* | (2006.01) | |
| *B33Y 10/00* | (2015.01) | |

(52) U.S. Cl.
CPC ........ *B29B 17/0404* (2013.01); *B29C 64/153* (2017.08); *B29C 64/245* (2017.08); *B29C 64/357* (2017.08); *B33Y 40/00* (2014.12); *B33Y 70/00* (2014.12); *B22F 2003/1059* (2013.01); *B22F 2999/00* (2013.01); *B29B 17/0408* (2013.01); *B29B 2017/042* (2013.01); *B29B 2017/0484* (2013.01); *B29C 2791/005* (2013.01); *B33Y 10/00* (2014.12); *Y02W 30/625* (2015.05)

(58) Field of Classification Search
CPC . B29B 17/04; B29B 17/0404; B29B 17/0408; B29B 2017/0484; B29C 41/50; B29C 64/153; B29C 64/357; B29C 2791/005

USPC .......................................... 264/85, 140, 497
See application file for complete search history.

(56) References Cited

U.S. PATENT DOCUMENTS

| | | | | |
|---|---|---|---|---|
| 5,738,817 | A * | 4/1998 | Danforth ............... | B29C 64/165 264/308 X |
| 6,245,281 | B1 | 6/2001 | Scholten et al. | |
| 2007/0126159 | A1* | 6/2007 | Simon .................... | B29C 64/153 264/497 |
| 2013/0196118 | A1* | 8/2013 | Bamberg ............... | B33Y 10/00 264/497 X |
| 2016/0361874 | A1* | 12/2016 | Park ...................... | B29C 64/357 |

FOREIGN PATENT DOCUMENTS

| | | |
|---|---|---|
| DE | 10330590 A1 | 4/2004 |
| DE | 19747309 B4 | 11/2007 |
| DE | 102013005008 A1 | 9/2014 |
| EP | 1663622 A1 | 6/2006 |
| EP | 2368696 B1 | 5/2012 |
| WO | WO-01/38061 A1 | 5/2001 |
| WO | WO-2012/053922 A1 | 4/2012 |

OTHER PUBLICATIONS

International Search Report (in English and German) and Written Opinion (in German) issued in PCT/DE2017/000233, dated Oct. 30, 2017; ISA/EP.

* cited by examiner

*Primary Examiner* — Leo B Tentoni
(74) *Attorney, Agent, or Firm* — Harness, Dickey & Pierce, P.L.C.

(57) ABSTRACT

The invention relates to a method for preparing waste powder from generative production processes, by means of which three-dimensional objects are produced in layers from a powdery base material. The aim of the invention is to provide a method for the combined mechanical and material preparation of waste powder, wherein the waste powder is brought into such a structure that subsequently, by mixing with or even without new powder or mixtures of new and waste powders, a high-quality powdery material becomes available for generative production processes. This aim is achieved in that the waste powder is subjected to a mechanical treatment by reducing the waste powder to small pieces with a grinding mill.

5 Claims, No Drawings

METHOD FOR PREPARING WASTE POWDER FROM GENERATIVE PRODUCTION PROCESSES

CROSS-REFERENCE TO RELATED APPLICATIONS

This application is a 371 U.S. National Stage of International Application No. PCT/DE2017/000233, filed on Jul. 26, 2017, which claims the benefit of German Patent Application No. 10 2016 009 770.1, filed on Aug. 8, 2016. The entire disclosures of the above applications are incorporated herein by reference.

FIELD

The invention relates to a method for preparing waste powder from generative production processes.

BACKGROUND

This section provides background information related to the present disclosure which is not necessarily prior art.

Various technological solutions are known for generative production processes in which a three-dimensional object is produced layer by layer by means of sintering or melting a powdery base material. Plastic powders which can easily be processed due to their low melting points and low heat conductivity are often used as the raw material.

Typical processes in this context are selective laser sintering (SLS), stereolithography (STL), and fused deposition modeling (FDM). In selective laser sintering, for example, a 3D CAD file is divided into two-dimensional planes having a thickness of about 0.1 mm. The coordinates of these planes are transmitted as datasets to a control computer. Then initially one layer of the powdery raw material is applied to the construction platform. Such materials already are the subject matter of numerous property rights. DE 197 47 309 B4, for example, describes a polyamide powder which is designed for selective laser sintering. The surface of the powder applied to the construction platform is then irradiated with a laser in accordance with the coordinates of the first plane. This energy input sinters the powder irradiated with the laser, such that a firm structure is formed. After completion of processing in this first plane, the construction platform is lowered by the layer thickness of one plane, and a new powder layer is applied. These steps are repeated in accordance with the number of planes, whereby a three-dimensional object is built layer by layer.

As the processing advances from plane to plane, powdery material remains outside the areas covered by the laser. This powder surrounds the three-dimensional object being built and initially provides some support during the further processing. However, this powder also remains after the three-dimensional object has been completely built and is removed from the platform.

It therefore seems obvious to use this unsolidified material, typically called "waste powder", for building another three-dimensional object. However, this can only be done depending on conditions, since at least the portions of waste powder disposed near the built object have been subjected to temperatures slightly below the melting point in the previous processing operations. This thermal stress inevitably leads to an aging process, as a result of which the original properties of the powdery raw material change somewhat in most cases. Consequently, waste powder is not used as the sole raw material but is always mixed with new powder.

DE 103 30 590 A1 says in this context that the portion of waste powder can be increased if a mixture of waste powder and new powder comprises a polyamide in which the ratio of terminal carboxyl groups to terminal amino groups is at least 2:1.

EP 2 368 696 B1 describes a powder mixture of two polyamide 12 powders, each of which comprise differing increases in viscosity numbers and are intermixed at a ratio between 10 and 30 percent by weight.

The references regarding prior state of the art cited herein primarily relate to compositions of waste powder and new powder that are chemically adjusted to one another. However, tests have shown that such chemical adjustment of the components alone is at least in some use cases not sufficient to achieve a high-quality base material for use in generative production processes by mixing waste powder and new powder. It is apparent that further treatment steps are useful, but hardly any exact information is known in this respect from the relevant technical literature.

SUMMARY

This section provides a general summary of the disclosure, and is not a comprehensive disclosure of its full scope or all of its features.

The invention relates to a method for preparing waste powder from generative production processes, by means of which three-dimensional objects are produced in layers from a powdery base material in that initially a first layer of said base material is applied to a construction platform, which first layer is then irradiated and hardened in accordance with the coordinates of a first plane of the object to be built using a laser or other source of radiation, wherein, after completion of processing in said first plane, the construction platform is lowered by the layer thickness of another plane and a new powder layer is applied, and wherein these process steps are repeated in accordance with the number of planes until a three-dimensional object is built, upon completion of which powdery material remains as waste powder outside the areas covered by the laser.

The problem addressed by this invention is to create a method for combined mechanical and material preparation of waste powder wherein the waste powder is brought into such a structure that subsequently, by mixing with or even without new powder or mixtures of new and waste powders, a high-quality powdery material becomes available for generative production processes.

This problem is solved in that the waste powder is subjected to a mechanical treatment in that it is reduced to small pieces by means of a grinding mill. Embodiments are the subject matter of dependent claims, whose technical features will be explained in more detail based on an exemplary embodiment.

Thus a method fora combined mechanical and material preparation of waste powder from generative production processes becomes available. The preferred field of application are laser sintering processes in which agglomerated polymer-based waste powder is brought back into its actual or an even finer initial condition by mechanical processing. At the same time, the material itself is prepared by defined temperature curves and temporary feeding of liquid media into it.

Further areas of applicability will become apparent from the description provided herein. The description and specific examples in this summary are intended for purposes of illustration only and are not intended to limit the scope of the present disclosure.

DETAILED DESCRIPTION

An exemplary embodiment of the invention is described below:

The method according to the invention is suitable for the preparation of waste powder from generative production processes in which three-dimensional objects are produced layer by layer from a powdery base material. In this method, initially a first layer of said base material is applied to a construction platform, which first layer is then irradiated and hardened in accordance with the coordinates of a first plane of the object to be built using a laser or other source of radiation. After processing in the first plane is completed, the construction platform is lowered by the layer thickness of another plane, and a new powder layer is applied. Similar process steps are repeated in accordance with the number of planes until a three-dimensional object is built. Such a workflow is known and needs not be explained in detail herein.

What is essential in the present state of affairs is the way in which the remaining powdery material is treated as so-called waste powder after the three-dimensional object has been completed.

This waste powder is subjected to a mechanical treatment in that it is reduced to small pieces by means of a grinding mill. The waste powder is preferably reduced to a grain size which matches the original grain size of the powder in its new condition. Likewise, the waste powder can be reduced to an even smaller grain size, that is, a size which is smaller than the original grain size of the powder in its new condition.

Exposure to nitrogen is preferable here. Particularly, the mechanical treatment of the waste powder is performed in a temperature range between −40° C. and +80° C.

Furthermore, the waste powder is first sprayed with water and/or ethanol during the mechanical treatment and afterwards dried again.

The foregoing description of the embodiment has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for preparing waste powder from generative production processes, by means of which three-dimensional objects are produced in layers from a powdery base material in that initially a first layer of said base material is applied to a construction platform, which first layer is then irradiated and hardened in accordance with the coordinates of a first plane of the object to be built using a laser or other source of radiation, wherein, after completion of processing in said first plane, the construction platform is lowered by the layer thickness of another plane and a new powder layer is applied, and wherein these process steps are repeated in accordance with the number of planes until a three-dimensional object is built, upon completion of which powdery material remains as waste powder outside the areas covered by the laser, wherein the waste powder is subjected to a mechanical treatment in that it is reduced to small pieces by means of a grinding mill, wherein the waste powder is reduced to a grain size which is smaller than an original grain size of the powder in its new condition.

2. The method according to claim 1, wherein the mechanical treatment of the waste powder is performed with exposure to nitrogen.

3. The method according to claim 1, wherein the mechanical treatment of the waste powder is performed in a temperature range between −40° C. and +80° C.

4. The method according to claim 1, wherein the waste powder is sprayed first with at least one of water and ethanol during the mechanical treatment and afterwards dried again.

5. A method for treating waste powder resulting from a generative production process of the type in which a three-dimensional object is produced in a plurality of layers from a powdery base material having a first grain size, wherein an initial layer of the base material is applied to a construction platform, the initial layer is then irradiated and hardened in accordance with coordinates of an initial plane of the object using a radiation source, wherein, after completion of processing of the initial layer in the initial plane, the construction platform is lowered by a layer thickness to a subsequent plane and a subsequent layer of the base material is applied, and wherein the steps are repeated in accordance with a number of planes until the three-dimensional object is produced, upon completion of which a portion of the powdery base material remains as waste powder outside of areas irradiated by the radiation source, the method comprising:
  grinding the waste powder in a mill to reduce the waste powder into small pieces;
  exposing the waste powder to nitrogen during grinding;
  exposing the waste powder to an ambient temperature between −40° C. and 80 ° C. during grinding;
  spraying the waste powder with at least one of water and ethanol during grinding; and
  drying the waste powder subsequent to grinding;
  wherein the waste powder is subjected to grinding until the waste powder has achieved a second grain size, wherein the second grain size is less than the first grain size.

* * * * *